United States Patent [19]

Terada et al.

[11] Patent Number: 4,812,012
[45] Date of Patent: Mar. 14, 1989

[54] OPTICAL FIBER ARRAY HAVING FIBER ISLANDS IN A POLYMER SEA

[75] Inventors: Hiromu Terada; Kenichi Sakunaga, both of Otake; Naoyuki Fukahori, Ayase, all of Japan

[73] Assignee: Mitsubishi Rayon Company Ltd., Tokyo, Japan

[21] Appl. No.: 127,415

[22] Filed: Dec. 2, 1987

[30] Foreign Application Priority Data

Dec. 12, 1986 [JP] Japan .................. 61-294721

[51] Int. Cl.$^4$ .............................................. G12B 6/04
[52] U.S. Cl. ............................. 350/96.24; 350/96.25
[58] Field of Search ................. 350/96.24, 96.25, 96.27

[56] References Cited

U.S. PATENT DOCUMENTS

| | | | |
|---|---|---|---|
| 3,238,837 | 3/1966 | Woodcock | 380/54 |
| 3,282,666 | 11/1966 | Gallagher et al. | 350/96.24 |
| 4,026,693 | 5/1977 | Sato | 65/31 |
| 4,222,630 | 9/1980 | Delignieres | 350/96.24 |
| 4,311,357 | 1/1982 | Lang | 350/6.9 |
| 4,352,550 | 10/1982 | Uchida | 355/3 R |
| 4,409,477 | 10/1983 | Carl | 250/227 |
| 4,564,261 | 1/1986 | Kojima et al. | 350/96.24 |
| 4,570,063 | 2/1986 | De Bie | 250/227 |
| 4,690,500 | 9/1987 | Hayami et al. | 350/96.25 |
| 4,730,895 | 3/1988 | Siedband et al. | 350/96.24 |

FOREIGN PATENT DOCUMENTS 0101112 2/1984 European Pat. Off. ......... 350/96.24
2505995 8/1975 Fed. Rep. of Germany ... 350/96.24

OTHER PUBLICATIONS

Applied Optics, vol. 20, No. 8, 15th Apr. 1981, pp. 1397-1402, New York, US; N. Takato et al.: "Tapered Fiber-Optic Sheet Formation and its Image-Guiding Properties", *pp. 1397-1399*.

Japanese Journal of Applied Physics, vol. 21, No. 12, part 2, Dec. 1982, pp. L749-L751, Tokyo, JP; J. E. Batubara et al.: "Image Transmission by a Step-Index Multimode Fiber", *p. L749*.

Primary Examiner—William L. Sikes
Assistant Examiner—Frank González
Attorney, Agent, or Firm—Oblon, Fisher, Spivak, McClelland & Maier

[57] ABSTRACT

An optical fiber array comprising a great number of multifilament type plastic optical fibers having a substantially rectangular peripheral sectional shape and including 10 to 10000 light-transmitting islands having a diameter of 5 to 200 μm, which are densely arranged in the sea, wherein one ends of the multifilament type plastic optical fibers are arranged in one line or a plurality of lines and the other ends thereof are integrated in a substantially rectangular or substantially circular shape.

6 Claims, 5 Drawing Sheets

OPTICAL FIBER ARRAY HAVING FIBER ISLANDS IN A POLYMER SEA

BACKGROUND OF THE INVENTION

1. Field of the Invention

The present invention relates to an optical fiber array formed of multifilament type plastic optical fibers, which can be used for a light point sensor, a line point light guide or a drawing-reading optical fiber sensor head wherein evenness in the light quantity is increased.

2. Description of the Related Art

A line point optical fiber array comprising many optical fibers having their one end aligned in a line shape and their other end integrated in a circular or rectangular shape, which is valuable as a light guide, was recently developed, and this line point optical fiber array has been used for various OA machines represented by copying machines. This line point optical fiber array has a great practical value but is defective in that, since the constituent optical fibers have a circular cross-section and a diameter exceeding 200 μm, the quantity of light of the line portion passing through these fibers is uneven. As a means for eliminating this light quantity unevenness, a light mixing element composed of a transparent resin is attached to the top end of the optical fiber array, but this mixing element is a main cause of a reduction of the light quantity in the optical fiber array. Moreover, since the cross-section of optical fibers aligned in the line portion as shown at 71 in FIG. 7 has a circular shape and has many dead spaces shown at 72 in FIG. 7, the light utilization efficiency as a linear light source is inevitably low.

An optical fiber array for reading optical indicators, in which one ends of optical fibers are arranged in the line form and the other ends are integrated at areas of definite addresses corresponding to the order on the line side, has been utilized mainly in the field of OA machines. In this optical fiber array, one ends of several thousands to scores of thousands of optical fibers must be arranged precisely at certain intervals in a line, and the other ends of these optical fibers must be arranged and integrated at definite positions corresponding to the arrangement positions on the line side. If the arrangement order is even slightly disturbed, a precise indicator reading becomes impossible. This arrangement operation is very difficult, and thus the ratio of a formation of defective products is very high in this operation.

SUMMARY OF THE INVENTION

Under this background, the present inventors carried out research into the developing of an optical fiber array free of the above-mentioned disadvantages and suitable for the reading of indicators or a high effective light guide, and as a result, have now completed the present invention.

More specifically, in accordance with the present invention, there is provided an optical fiber array comprising a great number of multifilament type plastic optical fibers of an islands-in-sea structure and having a substantially rectangular peripheral sectional shape and including 10 to 10000 light-transmitting islands having a diameter of 5 to 200 μm, which are densely arranged in the sea, wherein one ends of the multifilament type plastic optical fibers are arranged in one line or a plurality of lines and the other ends are integrated in a substantially rectangular or substantially circular shape. When this optical fiber array is used as a sensor head for an optical reading of indicators, the integrated end faces of the multifilament type optical fibers are integrated in areas of definite addresses corresponding to the arrangement order of the linearly arranged multifilament type optical fibers.

BRIEF DESCRIPTION OF THE DRAWINGS

FIGS. 1 and 6 are diagrams illustrating an optical fiber array, wherein

DESCRIPTION OF THE PREFERRED EMBODIMENTS

The multifilament type plastic optical fiber used in the present invention will now be described with reference to the accompanying drawings.

Figure 2:
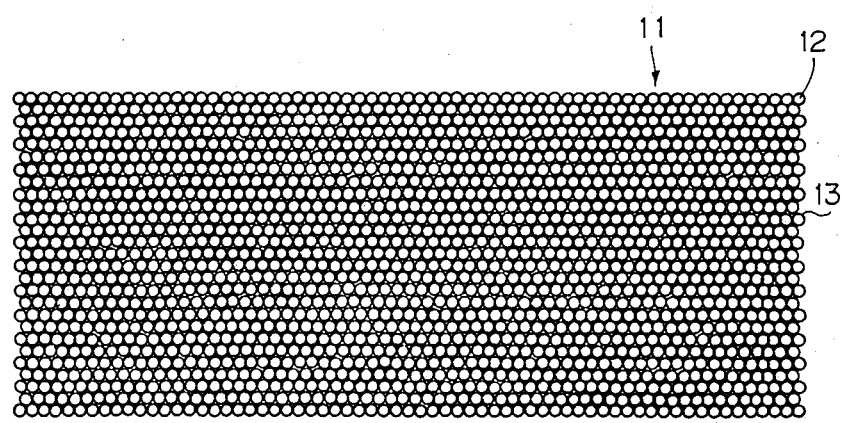
FIGS. 2 and 8 are sectional views of the multifilament type optical fiber used in the present invention.
Figure 8:
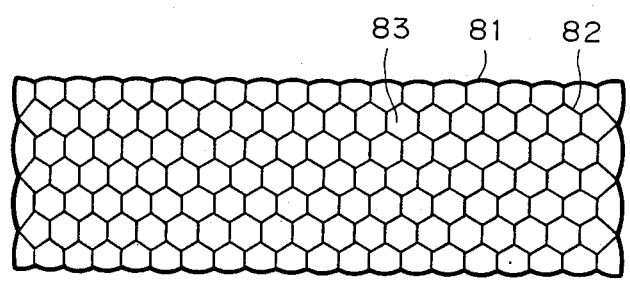

FIG. 2 is a sectional view illustrating an example of the multifilament type plastic optical fiber used in the present invention. In FIG. 2, reference numeral 11 represents the multifilament type plastic optical fiber used in the present invention, reference numeral 12 represents an island acting as an image-transmitting or light-transmitting element, and reference numeral 13 represents the sea. FIG. 8 is a sectional view illustrating an example of the multifilament type plastic optical fibers used in the present invention. In FIG. 8, reference numeral 83 represents an island acting as an image-transmitting or light-transmitting element, and reference numerals 81 and 82 represent the sea.

As shown in FIGS. 2 and 8, the islands of the multifilament type plastic optical fiber used in the present invention have a hexagonal or more highly polygonal section or a substantially circular section, and as shown, the islands must be densely arranged in the sea. Most preferably, the islands are arranged in a zigzag-stacked structure and a 1-to-1 correspondence is established in the arrangement positions of the islands on both the end faces of the multifilament type optical fiber. The multifilament type optical fiber preferably has a sea occupancy ratio in the cross-section of 5 to 40%, particularly 10 to 20%.

The peripheral sectional shape of the multifilament type plastic optical fiber used in the present invention is a rectangular shape. If the peripheral section has a circular shape, when the islands are densely arranged in a zigzag-stacked structure, the intended zigzag-stacked structure can be attained in the portion near the center of the section, but the arrangement structure is disturbed in the peripheral portion. Moreover, in the present invention where the ends of the optical fibers are arranged in a line, an island-free portion is formed between adjacent optical fibers and the sectional area unevenness is increased in the islands, with the result that an optical fiber array capable of transmitting clear images cannot be provided.

The islands preferably have a core-sheath structure comprising a core exerting a light-transmitting function and a sheath promoting the light transmission. If the islands present in the sea have no core-sheath structure, when a white light is transmitted, a set of white and black lines is formed as one line pair, but if the number of line pairs per mm is increased, it becomes difficult to decipher the boundary between white and black lines, and a multifilament type optical fiber having a good resolution cannot be obtained. Moreover, an optical fiber array having a sufficient performance is difficult to obtain when optical fibers having islands having no core-sheath structure are used.

The line density (line/mm) defining the resolution of the multifilament type optical fiber array is determined in the following manner.

A resolution test target (USAF 1951) is set on one end of a multifilament type optical fiber and a light from a light source is projected onto the target to transmit a test pattern. A converging lens and an image-receiving face are arranged on the multifilament optical fiber to judge the transmitted test pattern.

Furthermore, a photographic film is set on the image-receiving face and the transmitted test pattern can be recorded.

The line density of the multifilament type optical fiber used in the present invention is preferably at least 2 line pair/mm. If the line density is lower than 2 line pair/mm, it is difficult to transmit an image having a good resolution. In the present invention, it is generally preferable that the line density is 5 to 30 line pair/mm. If the line density exceeds 30 line pair/mm, the arrangement structure of the islands in the sea is disturbed and the sectional shape is often changed, resulting in a reduction of the resolution. In order to obtain a multifilament plastic optical fiber having the above-mentioned arrangement structure, preferably the diameter of the section of islands is 5 to 200 μm.

As examples of the plastics for forming the core and sheath components of islands of the multifilament type plastic optical fiber used in the present invention, there can be mentioned polymethyl methacrylate ($n=1.49$), a copolymer ($n=1.47$ to $1.50$) composed mainly of methyl methacrylate, polystyrene ($n=1.58$), a copolymer ($n=1.50$ to $1.58$) composed mainly of styrene, a styrene/acrylonitrile copolymer ($n=1.56$), poly-4-methylpentene-1($n=1.46$), an ethylene/vinyl acetate copolymer ($n=1.46$ to $1.50$), a polycarbonate ($n=1.50$ to $1.57$), polychlorostyrene ($n=1.61$), polyvinylidene chloride ($n=1.63$), polyvinyl acetate ($n=1.47$), a methyl methacrylate/styrene, vinyltoluene or α-methylstyrene/maleic anhydride terpolymer or quadripolymer ($n=1.50$ to $1.58$), polydimethylsiloxane ($n=1.40$), polyacetal ($n=1.48$), polytetrafluoroethylene ($n=1.35$), polyvinylidene fluoride ($n=1.42$), polytrifluoroethylene ($n=1.40$), polyperfluoropropylene ($n=1.34$), fluoroethylene copolymers or terpolymers ($n=1.35$ to $1.40$), a polyvinylidene fluoride/polymethyl methacrylate blend ($n=1.42$ to $1.46$), copolymers composed mainly of a fluoromethacrylate represented by the general formula $CH_2=C(CH_3)COORf$ in which Rf stands for $(CH_2)_n(CF_2)_nH$ ($n=1.37$ to $1.42$), $(CH_2)_m(CF_2)_nF$ ($n=1.37$ to $1.40$), $CH—(CF_3)_2$ ($n=1.38$), $C(CF_3)_3$ ($n=1.36$), $CH_2CF_2CHCFCF_3$ ($n=1.40$) or $CH_2CF(CF_3)_2$ ($n=1.37$), copolymers of these fluoromethacrylates ($n=1.36$ to $1.40$), copolymers of such a fluoromethacrylate with methyl methacrylate ($n=1.37$ to $1.43$), polymers composed mainly of a fluoroacrylate represented by the general formula $CH_2=CH.COOR'f$ in which R'f stands for $(CH_2)_m(CF_2)_nF$ ($n=1.37$ to $1.40$), $(CH_2)_m(CF_2)_nH$ ($n=1.37$ to $1.41$), $CH_2CF_2CHF—_3$ ($n=1.41$) or $CH(CH_3)_2$($n=1.38$), copolymers of these fluoroacrylate ($n=1.36$ to $1.41$), copolymers of such a fluoroacrylate and a fluoromethacrylate as described above ($n=1.36$ to $1.41$), copolymers of these fluoroacrylate and fluoromethacrylate with methyl methacrylate ($n=1.37$ to $1.43$), and homopolymers and copolymers ($n=1.37$ to $1.42$) composed mainly of a 2-fluoroacrylate represented by the general formula $CH_2=CF.COOR''f$ in which R''f stands for $CH_3$, $(CH_2)_m(CF_2)_nF$, $(CH_2)_m(CF_2)_nH$, $CH_2CF_2CHFCF_3$ or $C(CF_3)_2$.

In order to prevent an increase of the transmission loss of light transmitted in the islands, the difference of the refractive index $n_1$ of the core polymer constituting the islands and the refractive index $n_2$ of the sheath or sea polymer must be at least 0.01. In the case of a multifilament type optical fiber prepared from polymers in which the value of ($n_1-n_2$) is smaller than 0.01, a leakage of light introduced into the core component to the sheath layer is observed, and the sharpness of the transmitted image is drastically reduced in the multifilament type optical fiber.

Figure 3:
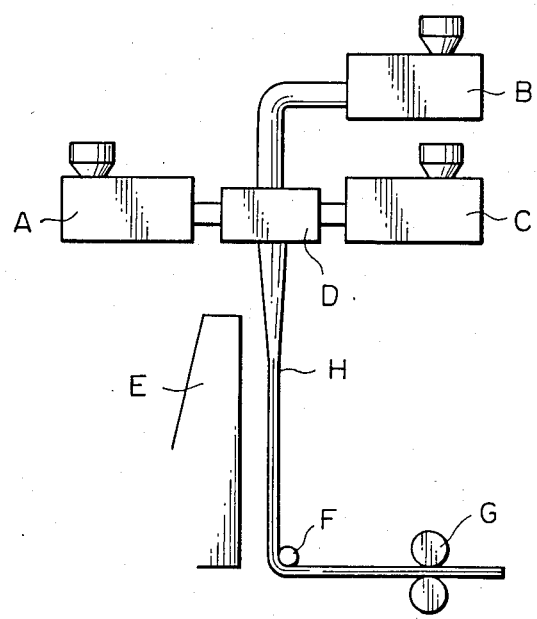
FIG. 3 is a diagram illustrating a spinning apparatus used in the present invention for producing a multifilament type plastic optical fiber.

FIG. 3 is a diagram illustrating the steps of preparing the multifilament type plastic optical fiber used in the present invention, and in FIG. 3, symbols A, B, C, D, E, F, G and H represent a core-forming polymer-supplying extruder, a sheath-forming polymer-supplying extruder, a sea-forming polymer-supplying extruder, a spinneret, a cooler, a guide roll, take-up roll and a spun multifilament type plastic optical fiber, respectively.

Figure 4:
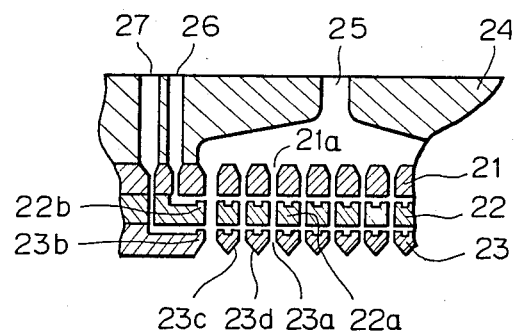
FIG. 4 is a diagram illustrating the cross-section of a spinneret of the spinning apparatus shown in FIG. 3.

FIG. 4 is a diagram illustrating the cross section of the spinneret D, and reference numeral 24 represents a distributing plate for distributing the core-forming polymer, sheath-forming polymer and sea-forming polymer constituting the multifilament type plastic optical fiber, reference numeral 25 represents a core-forming polymer-supplying hole, reference numeral 26 represents a sheath-forming polymer-supplying hole, reference numeral 27 represents a sea-forming polymer-supplying hole, reference numeral 21 represents a core-forming orifice plate, reference numeral 21a represents a core-forming nozzle hole, reference numeral 22 represents a sheath-forming orifice plate, reference numeral 22a represents a sheath-forming nozzle hole, reference numeral 23 represents a sea-forming orifice plate, and reference numeral 23a represents a sea-forming nozzle hole. The core-forming polymer supplied from 21a forms a molten polymer stream having a substantially circular section and is spun out from 22a through 23a. The sheath-forming polymer supplied from 26 overflows a circular projection 22b circularly surrounding the lower end of the core-forming nozzle hole and is bonded in a uniform thickness to the periphery of the core-forming polymer stream while forming an island, and the so-formed island is delivered to the sea-forming nozzle hole 23a. The sea-forming polymer supplied from 27 overflows a circular projection surrounding the lower end of the sheath-forming nozzle hole, flows downward while adhering to the periphery of the sheath-forming polymer, further flows down along a downwardly expanded oblique side wall formed on the lower end face of the sea-forming orifice plate, and fusion-bonds the islands, that is, sheath-core filaments, to one another while filling the spaces among the islands, whereby a prototype of the multifilament type plastic optical fiber of the present invention is formed.

Figure 5:
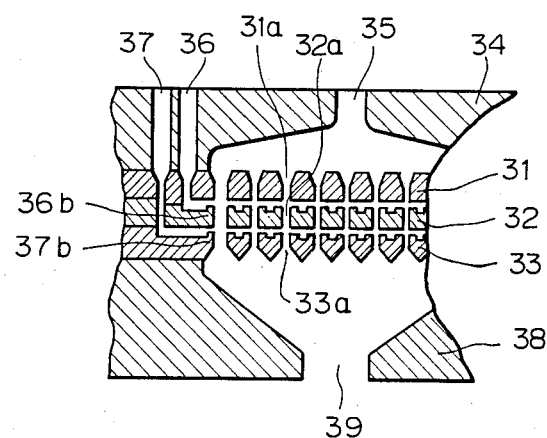
FIG. 5 is a sectional view of a spinneret used for producing a multifilament type optical fiber.

FIG. 5 shows a section of a spinneret which is effectively used for preparing, at a high efficiency, a multifilament type plastic optical fiber having a number of image elements, as used in the present invention. In FIG. 5, reference numeral 31 represents a core-forming orifice, reference numeral 32 represents a sheath-forming orifice, reference numeral 33 represents a sea-forming orifice, and reference numeral 34 represents an orifice for distributing the respective components. Reference numerals 35, 36, and 37 represent a core polymer supplying hole, a sheath polymer supplying hole, and a sea polymer supplying hole, respectively, and reference numeral 38 represents a gathering orifice for forming a multifilament type optical fiber. Reference numeral 31a represents a core-forming nozzle and reference numeral 32 represents a sheath-forming nozzle, and reference numeral 33a represents a sea-forming nozzle, which is characterized in that the nozzle 33a has on the lower end thereof a trumpet-shaped opening. Reference numeral 39 represents a gathering nozzle, and reference numerals 36b and 37b represent slits for regulating flows of the sheath polymer and sea polymer in the orifices, respectively.

Since the so-prepared multifilament type plastic optical fiber has a rectangular peripheral shape as shown in FIG. 2, the sectional shape can be uniformalized more than in the conventional circular-section optical fiber heretofore used for line point sensors, and the linear arrangement on one end and the integrated arrangement on the other end are greatly improved.

The optical fiber array of the present invention can be fabricated by arranging multifilament type optical fibers cut to a predetermined length on an outer plate for linear arrangement, and assembling the other ends in a rectangular shape. Alternatively, multifilament type optical fibers are regularly wound on a winding drum, and the wound assembly is cross-sectionally cut while bonding the wound portions to one another, whereby linearly arranged ends of the multifilament type optical fibers can be formed. The other ends are integrated to form a predetermined shape.

According to the present invention, since multifilament type optical fibers are used, the number of the multifilament type optical fibers arranged in lines can be greatly reduced, compared with the number of optical fibers arranged in the conventional gathering method customarily adopted for the production of optical fiber arrays, and the number of image elements can be increased to more than several times the number of image elements attainable in the conventional method. Therefore, the quantity unevenness in light transmitted through the respective transmission systems can be eliminated and an optical fiber array comprising multifilament type optical fibers capable of transmitting a bright image having a high image quality can be provided.

In the optical fiber array of the present invention, in the gathering portion on the line side, a sheet-like assembly composed of multifilament type optical fibers arranged in a line on a plane or a laminate of a plurality of such sheet-like assemblies is formed, and in the integrated portion on the other side (the gathering portion on the area side), an assembly of multifilament type optical fibers in which the sections of the optical fibers are laminated and arranged in predetermined order in a shape of a certain area, such as a square or rectangular shape, or an assembly having a substantially circular shape is formed.

For example, if an apparatus for reading a large drawing is fabricated by using the multifilament type optical fiber array of the present invention, the reading operation can be performed stably at a high speed, and high performances can be attained with a high resolution.

The optical fiber array of the present invention can be utilized not only for reading large drawings (conversion to electric signals) but also for a conversion of optical signals to electric signals and a preparation of input data in automatic designing by a computer, grating of sewing patterns, casting of shipbuilding iron plates, and the like.

The optical fiber array of the present invention will now be described in detail with reference to the accompanying drawings.

Figure 1:
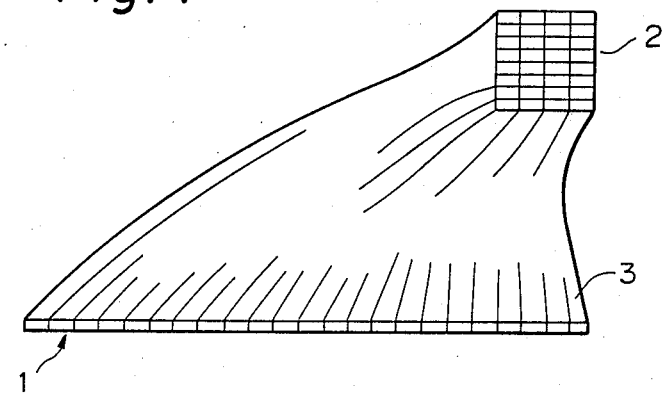
Figure 6:
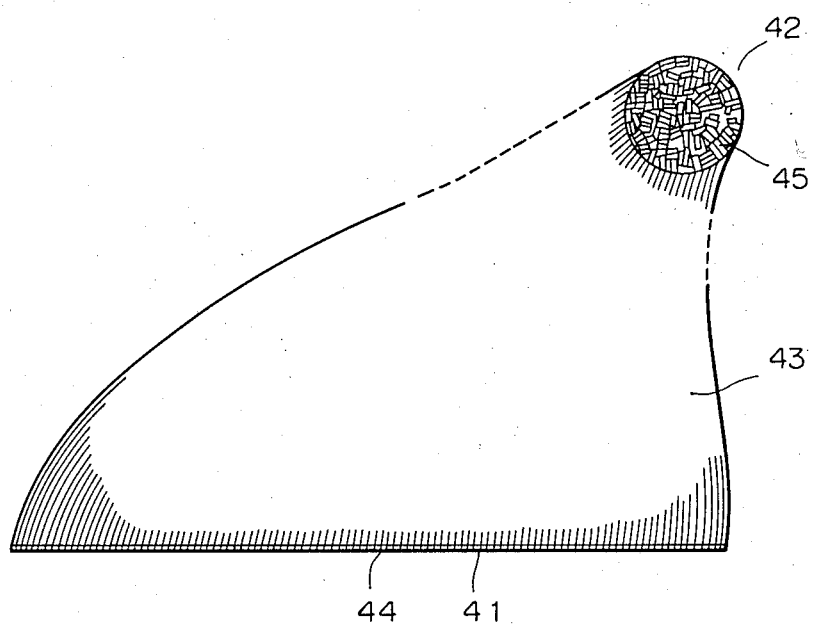
Figure 7:
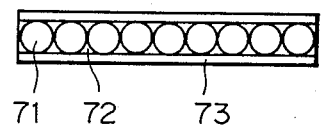
FIG. 7 is a plan view of the line part of a line point light made of optical fibers of a circular cross-section.

FIG. 1 is a schematic view showing the optical fiber array of the present invention, and FIG. 6 is a perspective view illustrating another embodiment of the optical fiber array of the present invention. In the drawings, reference numerals 41 and 45 represent multifilament type optical fiber ends, and reference numeral 44 represents a line portion where end faces of multifilament type optical fibers are arranged in a line. Reference numeral 42 represents a point portion where end faces 45 of multifilament type optical fibers are gathered in a substantially circular shape. In the optical fiber array having the above-mentioned structure, since the gathering portion has a substantially circular shape, the point portion can be easily connected to a light source when the optical fiber array is used as a line light guide. Therefore, the optical fiber array of the present invention can be advantageously used as a line light guide.

In the optical fiber array shown in FIG. 1, an optical signal is incident from the end of the gathering portion 1 on the line side, transmitted through multifilament type optical fibers 3, and emitted from the gathering portion 2 on the area side. In the gathering portion 1 on the line side, optical fibers are arranged at pitch intervals l as shown in FIG. 1A, which is an enlarged side view of portion A in FIG. 1, and in the gathering portion 2 on the area side, optical fibers are arranged at longitudinal pitches l' and lateral pitches l as shown in FIG. 1B, which is an enlarged side view of portion B shown in FIG. 1.

Figure 1A:
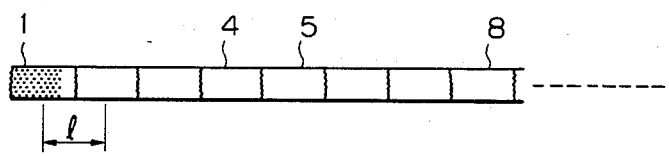
FIG. 1A is an enlarged side view of portion 1 in FIG. 1.
Figure 1B:
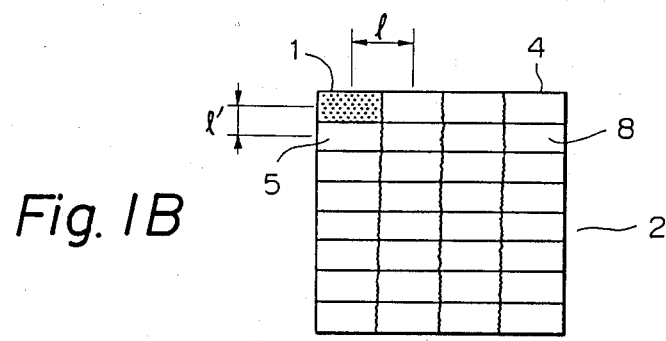
FIG. 1B is an enlarged side view of portion 2 in FIG. 1.

At the gathering operation, optical fibers are arranged so that, for example, addresses 1 and 4 on the line side correspond to addresses 1 and 4 on the area side, as shown in FIGS. 1A and 1B. Ordinarily, the light signal emitted from the gathering portion 2 on the area side is converted to an electric signal by a CCD camera (solid camera member), if necessary through a lens.

The present invention will now be described with reference to the following example.

EXAMPLE

Three multifilament type optical fibers having the properties shown in Table 1 were prepared by using a spinneret having a sectional structure as shown in FIG. 5 and a hole number shown in Table 1, and by spinning polymethyl methacrylate having a refractive index of 1,492 and a melt flow rate of 1.2 as the core-forming polymer, a polyfluoromethacrylate having a refractive index of 1.415 and a melt flow rate of 6 as the sheath-forming polymer, and a vinylidene fluoride copolymer having a melt flow rate of 12 as the sea component. When the sections of the optical fibers were enlarged and observed, it was found that each fiber had a structure as shown in FIG. 2. Furthermore, it was confirmed that each fiber had a very high image-resolving power.

TABLE 1

|  | Run No. 1 | Run No. 2 | Run No. 3 |
|---|---|---|---|
| Number of holes | 2990 | 2990 | 1350 |
| Lamination structure of islands | zigzag-stacked structure | zigzag-stacked structure | zigzag-stacked structure |
| Sectional shape of islands | circular | circular | circular |
| Peripheral sectional shape of multifilament type optical fiber | rectangular | rectangular | rectangular |
| Resolution (test target USAF 1951) (line pair/mm) | group 4, element 5 (25.39) | group 3, element 6 (14.3) | group 1, element 2 (2.24) |
| Transmission characteristic (sharpness of transmitted image) | very sharp | very sharp | sharp |

With respect to each of the three multifilament type optical fibers shown in Table 1, a multifilament type optical fiber array was prepared by winding the multifilament type optical fibers on a rotary drum to form a multifilament type optical fiber sheet, bonding the fibers to one another, cutting the bonded portion to form a line portion, and arranging and integrating the other ends of the fibers at predetermined addresses.

When the so-prepared optical fiber arrays were attached to an apparatus for reading large drawings, in each case the desired performances could be obtained and the reading operation could be performed at a high speed with an excellent operation adaptability.

Furthermore, one ends of 130 multifilament type optical fibers of Run No. 3 in Table 1 were arranged in a line and the other ends were integrated in a substantially circular shape to form a point portion, as shown in FIG. 6. A light source was connected to the point portion to fabricate a line light. The quantity of the light emitted from the line portion, which could be effectively utilized was much larger than the light quantity attained in the conventional line light comprising optical fibers having a circular section.

We claim:
1. An optical fiber array comprising:
   a plurality of multifilament type plastic optical fibers having a substantially rectangular peripheral sectional shape and including 10 to 10,000 light-transmitting islands having a diameter of 5 to 200 microns;
   a sea component wherein said multifilament type plastic optical fibers are densely arranged in said sea component and wherein one end of the multifilament type plastic optical fibers are arranged in one of a single line and a plurality of lines and wherein the other end of said fibers are integrated in one of a substantially rectangular and substantially circular shape.
2. An optical fiber array as set forth in claim 1, wherein the islands of the multifilament optical fibers are densely arranged in a zigzag-stacked structure.
3. An optical fiber array as set forth in claim 1, wherein the rectangularly integrated ends of the multifilament type optical fibers are integrated at particular addressable locations corresponding to the arrangement order on the line side.
4. An optical fiber array as set forth in claim 1, wherein the resolution of said array is defined by the tested line density of the multifilament type optical fiber and wherein said line density is at least 2 line pair/mm.
5. An optical fiber array as set forth in claim 4, wherein said line density is 5 to 30 line pair/mm.
6. An optical fiber array as set forth in claim 1, wherein the difference of the refractive index of a core polymer constituting the islands and the refractive index of the sea or sheath polymers is at least 0.01.

* * * * *